United States Patent [19]

Willson et al.

[11] Patent Number: 4,866,987
[45] Date of Patent: Sep. 19, 1989

[54] OPTICAL TRANSDUCER SYSTEMS

[75] Inventors: Jolyon P. Willson, Duxford; Philip J. Parsons, Enfield, both of England

[73] Assignee: Schlumberger Industries Limited, Farnborough, United Kingdom

[21] Appl. No.: 216,607

[22] Filed: Jul. 8, 1988

[30] Foreign Application Priority Data

Jul. 10, 1987 [GB] United Kingdom ............... 8716372

[51] Int. Cl.$^4$ ........................................... G01M 19/00
[52] U.S. Cl. ..................................... 73/655; 324/175
[58] Field of Search .............. 324/175, 457, 458, 80, 324/109; 73/655, 662, DIG. 1; 310/309; 357/25, 27

[56] References Cited

U.S. PATENT DOCUMENTS

4,536,708  8/1985  Schneider ........................... 324/174
4,547,729  11/1985  Adolfsson et al. ............. 324/109 X

FOREIGN PATENT DOCUMENTS

61-38566  2/1986  Japan .
2121953  1/1984  United Kingdom .

OTHER PUBLICATIONS

Microelectronic Engineering, vol. 3, No. 1/4, Dec. 1986, pp. 221-234.

Primary Examiner—Jerry W. Myracle
Attorney, Agent, or Firm—Sanford J. Asman

[57] ABSTRACT

An optical transducer system for producing an optical output signal representative of the rotational speed of a rotary member, particularly a shaft of a gas turbine engine, comprises a conventional inductive speed probe positioned adjacent the shaft to sense the passing of the teeth of a toothed wheel secured to and rotatable with the shaft. The inductive sensor thus produces an AC output signal whose frequency is proportional to the rotational speed of the shaft, and this signal is used to excite electrostatically vibration of a cantilever beam micromachined in silicon. The vibrating beam is arranged in an optical path defined by one or more optical fibres, such that its vibrations modulate light directed along the optical path at a frequency which is again proportional to the rotational speed of the shaft.

10 Claims, 1 Drawing Sheet

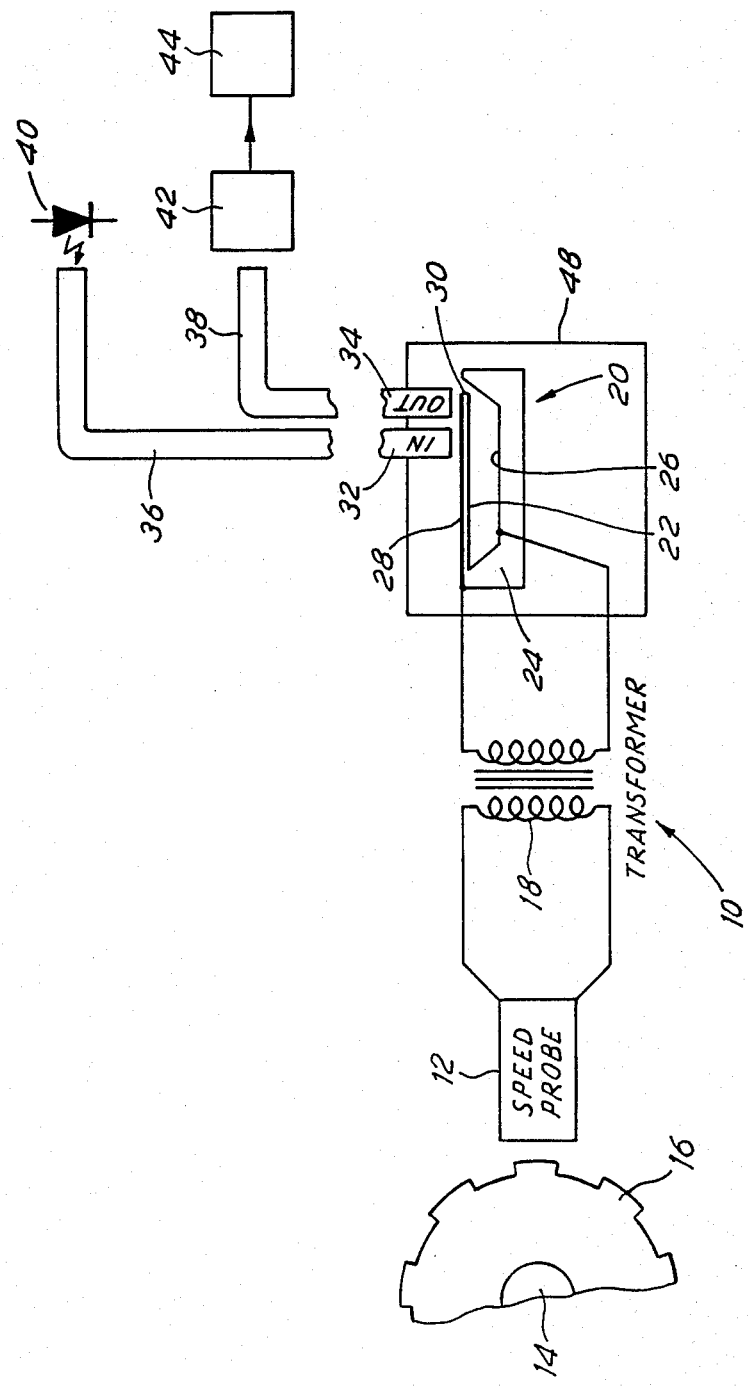

OPTICAL TRANSDUCER SYSTEMS

This invention relates to optical transducer systems, and is more particularly but not exclusively concerned with an optical transducer system for producing an optical output signal representative of the rotational speed of a shaft in a gas turbine engine.

Although inductive shaft speed sensors for gas turbine engines are well established and reliable, the current trend towards the use of optical transducer systems, particularly in relation to aircraft gas turbine engines, is making it increasingly desirable to provide an optical shaft speed sensor. Typical prior art proposals for such a sensor have involved arranging for a beam of light to be periodically interrupted by means rotatable with the shaft. However, this means that both the beam and the means for directing it, typically optical fibres, must be mounted closely adjacent the shaft, where they are subject to contamination and elevated temperatures (>250° C.): in particular, the beam is subject to attenuation by oil mist, while optical fibres which can withstand such elevated temperatures are very expensive. It is therefore an object of the present invention to provide an optical transducer system in which the problems of the prior art proposals are overcome.

According to the present invention, there is provided an optical transducer system for producing an optical output signal representative of the rotational speed of a rotatable member, the system comprising:

an inductive sensor adapted to be mounted adjacent the rotatable member, for producing an AC electrical output signal whose frequency is proportional to the rotational speed of the rotatable member;

means defining an optical path;

a vibratable member disposed in said optical path so that vibration of the vibratable member modulates light directed along said path; and means for applying said AC electrical signal to said vibratable member to cause it to vibrate at a frequency dependent on the frequency of the AC signal.

In the context of a shaft speed measuring system for a gas turbine engine, this arrangement means the vibratable member and the means defining the optical path can be positioned a small distance away from the shaft, where the temperature is much lower, and the optical path can be completely sealed from the oily environment around the shaft.

In a preferred embodiment of the invention, the vibratable member comprises a cantilever member formed in silicon by micromachining.

The cantilever member is preferably formed in a silicon substrate, such that it extends partly across a cavity micromachined in silicon beneath the cantilever member.

Advantageously, the cantilever member is provided with an electrode on its upper surface, i.e. the surface thereof facing away from the cavity, and the electrical signal applying means is connected between said electrode and the silicon beneath the cantilever member so as to excite said vibrations of the cantilever member electrostatically.

The electrical signal applying means may conveniently comprise a step-up transformer connected to receive and step up the AC electrical signal from the inductive sensor.

Preferably, the optical path defining means comprises an input optical fibre having one end arranged to direct a beam of light onto said cantilever member and an output optical fibre having one end arranged to receive said beam after reflection from the cantilever member.

Said ends of the input and output optical fibres may be substantially parallel to each other, and respectively arranged to direct said beam substantially perpendicularly onto, and to receive said beam substantially perpendicularly from, the upper surface of the free end of said cantilever member.

Alternatively, said ends of the fibres may lie in a common plane substantially perpendicular to the upper surface of the cantilever member and passing through its free end, and be inclined at substantially equal angles, typically about 35° to 40°, to a line perpendicular to said upper surface.

Said ends of the optical fibres and said cantilever member and its substrate are preferably sealed within a common housing.

The invention will now be described, by way of example only, with reference to the accompanying drawing, which is a much simplified diagrammatic representation of an optical transducer system in accordance with the invention, for measuring the rotational speed of a shaft of an aircraft gas turbine engine.

The optical transducer sysem shown in the drawing is indicated generally at 10, and comprises a conventional inductive speed probe or sensor 12. The sensor 12 is positioned closely adjacent a gas turbine engine shaft 14 whose rotational speed is to be measured, so as to sense the passage of the teeth of a toothed wheel 16 coaxially secured to and rotatable with the shaft. The construction of the sensor 12 can take the form of the inductive sensor 12 described in detail with reference to FIGS. 3 to 5 of United Knigdom Patent No 2 082 859.

The sensor 12 co-operates in a well known manner with the toothed wheel 16 during rotation of the shaft 14 to generate an AC electrical output signal whose frequency is proportional to the rotational speed of the shaft: the constant of proportionality can be varied by changing the number of teeth on the toothed wheel. The output of the sensor 12, typically 5 mA RMS, is applied to a step-up transformer 18, whose output is in turn applied to a sealed semiconductor device 20 incorporating a vibratable member 22, so as to cause the vibratable member 22 to vibrate at a frequency proportional to the frequency of the AC signal produced by the sensor 12.

The device 20 comprises a silicon substrate 24 having a cavity 26 micromachined into its upper surface in such a manner as to produce the vibratable member 22 as a cantilever which is contiguous with the upper surface of the substrate and extends nearly all the way across the cavity. An electrode in the form of a thin electrically conductive layer 28 is deposited on the upper surface of the cantilever 22, and the output of the transformer 18 is applied between this electrode and the substrate 24 to excite the aforementioned vibration of the cantilever electrostatically. The vibration primarily takes place transversely of the length of the cantilever 22, in the plane of the drawing, i.e. the free end 30 of the cantilever moves down and up, as viewed in the drawing, into of and out of the cavity 26, and by virtue of the electrostatic excitation, the frequency of the vibration is twice the frequency of the AC signal produced by the sensor 12.

Positioned immediately above and closely adjacent the free end 30 of the cantilever 22 are the parallel ends 32, 34 of two optical fibres 36, 38. The fibre 36 is an input fibre, and directs a light beam derived from a laser diode 40 from the end 32 of the fibre 36 perpendicularly onto the free end 30 of the cantilever 22. The electrode 28 acts as a reflector to reflect this beam back into the end 34 of the fibre 38. However, the vibration of the free end 30 of the cantilever serves to modulate the beam as it is reflected back into the fibre 38. The modulated reflected beam leaving the device 20 thus represents an optical output signal from the transducer system 10 whose modulation frequency is representative of the speed of rotation of the shaft 14. This optical output signal is detected at the other end of the fibre 38 by a photodetector 42, whose output is in turn demodulated by a demodulator 44 to produce an electrical output signal representative of the rotational speed of the shaft.

The device 20 and the ends 32, 34 of the fibres 36, 38 are hermetically sealed in a housing 48, to protect them from the oil environment around the shaft 14. The housing 48 is mounted away from the shaft 14 in a region of much lower temperature, eg on the outside of the engine casing (not shown): the transformer 18 can be mounted in the same place if desired. The diode 40, the detector 42 and the demodulator 44 can clearly be in an engine control unit remote from the shaft 14 (or even remote from the engine), with the fibres 36, 38 being extended as necessary by the use of optical connectors: indeed such optical connectors can if desired be provided on the outside of the device 20, to connect the fibres 36, 38 to the ends 32, 34.

Many modifications can be made to the described embodiment of the invention.

For example, the fibre ends 32, 34 can be inclined to one another, in the plane of the drawing, at equal angles of say 35° to 40° on each side of the normal to the upper surface of the free end 30 of the cantilever 22. This greatly increases sensitivity, ie the amount of modulation for a given vibration amplitude, but makes fabrication more difficult and therefore more expensive.

Alternatively, the two fibres can be replaced by a single fibre perpendicular to the upper surface of the free end 30 of the cantilever 22, this single fibre serving as both an input and an output fibre. In this case, a ball lens can be formed on the end of the fibre adjacent the cantilever 32, to increase sensitivity, and a beam splitter or fibre optical coupler is used to separate out the reflected beam at the other end of the fibre.

Additionally, vibratable members in forms other than that of the cantilever 22 can be envisaged, for example vibratable beams, diaphragms or paddles. Further, in some circumstances, the laser diode 40 can be replaced by a less expensive light emitting diode if desired.

In addition to its applicability to shaft sensing systems, the present invention is also applicable to systems of the kind described in the aforementioned United Kingdom Patent Application No 2 082 859 for sensing the torque applied to a shaft.

Clearly, the invention can be used to produce an optical output signal representative of the rotational speed of rotatable members other than shafts, for example wheels:

We claim:

1. An optical transducer system for producing an optical output signal representative of the rotational speed of a rotatable member, the system comprising:
    an inductive sensor adapted to be mounted adjacent the rotatable member, for producing an AC electrical output signal whose frequency is proportional to the rotational speed of the rotatable member;
    means defining an optical path;
    a vibratable member disposed in said optical path so that vibration of the vibratable member modulates light directed along said path; and
    means for applying said AC electrical signal to said vibratable member to cause it to vibrate at a frequency dependent on the frequency of the AC signal, wherein the vibratable member is formed in silicon by micromachining.

2. A system as claimed in claim 1, wherein the vibratable member comprises a cantilever member.

3. A system as claimed in claim 2, wherein the cantilever member is formed in a silicon substrate, such that it extends partly across a cavity micromachined in silicon there beneath.

4. A system as claimed in claim 2, wherein the cantilever member is provided with an electrode on its upper surface, and the electrical signal applying means is connected between said electrode and the silicon beneath the cantilever member so as to excite said vibrations of the cantilever member electrostatically.

5. A system as claimed in claim 2, wherein the optical path defining means comprises an input optical fibre having one end arranged to direct a beam of light into said cantilever member and an output optical fibre having one end arranged to receive said beam after reflection from the cantilever member.

6. A system as claimed in claim 5, wherein said ends of the input and output optical fibres are substantially parallel to each other, and respectively arranged to direct said beam substantially perpendicularly onto, and to receive said beam substantially perpendicularly from, the upper surface of the free end of said cantilever member.

7. A system as claimed in claim 5, wherein said ends of the fibres lie in a common plane substantially perpendicular to the upper surface of the cantilever member and passing through its free end, and are inclined at substantially equal angles to a line perpendicular to said upper surface.

8. A system as claimed in claim 7, wherein said equal angles are about 35° to 40°.

9. A system as claimed in claim 5, wherein said ends of the optical fibres and said cantilever member and its substrate are sealed within a common housing.

10. A system as claimed in claim 1, wherein electrical signal applying means comprises a step-up transformer connected to receive and step up the AC electrical signal from the inductive sensor.

* * * * *